C. H. MYERS.

DISK MARKER.

APPLICATION FILED FEB. 12, 1910.

Reissued Apr. 19. 1910.

13,102.

Witnesses

Robert Plowe

Chas. S. Daley

Inventor

Charles H. Myers

By Chas. N. LaPorte

Atty

ANDREW B. GRAHAM CO., PHOTO-LITHOGRAPHERS, WASHINGTON, D. C.

UNITED STATES PATENT OFFICE.

CHARLES H. MYERS, OF LE ROY, ILLINOIS.

DISK MARKER.

13,102. Specification of Reissued Letters Patent. Reissued Apr. 19, 1910.

Original No. 885,362, dated April 21, 1908, Serial No. 374,647. Application for reissue filed February 12, 1910. Serial No. 543,644.

*To all whom it may concern:*

Be it known that I, CHARLES H. MYERS, a citizen of the United States, residing at Le Roy, in the county of McLean and State of Illinois, have invented a new and useful Disk Marker, of which the following is a specification.

This invention has relation to disk markers adapted to be used on planters and similar implements and it consists in the novel construction and arrangement of its parts as hereinafter shown and described.

The object of the invention is to provide a simple and durable marker of the character indicated which may be easily and readily adjusted to any desired angle with relation to the line of draft and which may be shifted laterally with relation to the implement.

The marker may be adjusted so as to throw the earth toward the implement or away from the same, as desired, and may be used at either side of the implement.

Figure 1:
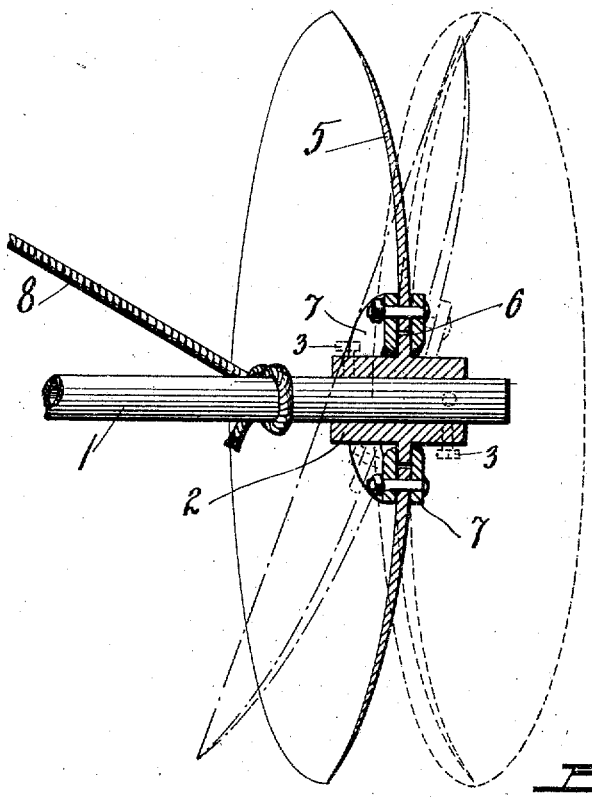
Figure 2:
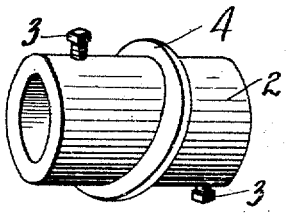
Figure 3:
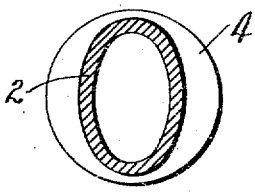

In the accompanying drawing:—Figure 1 is a top plan view of the shaft with the marker and collar in section showing some of the various positions that they may be operated in; Fig. 2 is a perspective view of the collar; Fig. 3 is a sectional view of the collar showing the contour of a flange located thereon.

The marker consists of the staff or shaft 1 which is preferably a section of pipe. The collar 2 fits on the said pipe and may slide longitudinally thereof. The said collar is held in place upon the shaft 1 by means of the set screws 3 which are oppositely disposed to each other and located in the vicinity of the opposite end of the said collar. The collar 2 may also be turned on the shaft 1. The collar 2 is provided upon its periphery with the annular flange 4 which is pitched at an acute angle to the longitudinal axis of the collar and which is provided with a circular periphery. The disk 5 is provided with a central opening 6 which receives the flange 4. The rings 7, 7 are bolted to the opposite sides of the disk 5 at the opening 6 thereof and bear laterally against the opposite sides of the flange 4. The inner end of the shaft 1 is attached to the implement in the usual manner and a guy rope or wire 8 is provided for holding the shaft 1 at a desired angle with relation to the implement.

From the foregoing description it is obvious that by loosening the set screws 3, collar 2, and its attachments may be shifted longitudinally of the shaft 1 so that the disk 5 may be positioned at a desired distance from the implement. Also by reason of the angle of inclination of the flange 4 with relation to the longitudinal axis of the collar 2 that by turning the collar 2 on the shaft 1 the disk 5 may be inclined more or less toward the surface of the ground, thus increasing or decreasing the breadth of the mark that it will make at the surface of the ground. The collar 2 may be so placed upon the shaft 1 that the concaved side of the disk 5 will be toward the implement or the convexed side of the said disk will be toward the implement. Thus the earth from the lines being marked may be thrown toward or away from the implement as desired. It is also obvious that the shaft 1 may be applied to or swung from one side of the implement to the other in the usual manner.

Having described my invention what I claim as new and desire to secure by Letters-Patent is:—

1. A disk marker comprising a shaft, a disk journaled for rotation, a guiding flange mounted on the shaft and passing through the center of the disk and being disposed at an acute angle to the longitudinal axis of the shaft.

2. A disk marker comprising a shaft, a collar located thereon, a flange carried by the collar and being disposed at an acute angle to the longitudinal axis of the shaft, and a journaled disk having a central opening which receives said flange.

3. In a marker for agricultural implements, in combination, a straight shaft, a collar adjustable lengthwise of the shaft and also rotatably adjustable thereon, a flange on said collar, said flange disposed at an acute angle to the axis of the collar, and a disk revolubly carried on said collar and guided by said flange, substantially as specified.

4. In a marker for agricultural implements, in combination, a straight shaft, a collar carried on said shaft, said collar provided with a flange disposed at an acute angle to the axis of said collar, a concavo-convex disk carried on said collar, means for retaining said disk in operative relation with the flange on the collar, whereby the flange serves as a guide for the disk during the rotation thereof, said collar being reversible on the shaft so as to locate the convex or concave side of the disk toward the implement; substantially as specified.

5. In a marker for agricultural implements, in combination, a straight shaft, a collar carried on said shaft, a flange carried by the collar and being disposed at an acute angle to the axis of the collar, means for adjusting the collar longitudinally of the shaft to position said collar nearer to or farther from the implement, a concavo-convex disk carried on the collar, means for retaining said disk in operative relation with the flange on the collar, whereby the flange serves as a guide for the disk during the rotation thereof, said collar being reversible on the shaft so as to locate the convex or concave side of the disk toward the implement, substantially as specified.

6. In a marker for agricultural implements, in combination, a straight shaft, a collar carried thereon, a flange on the collar disposed at an acute angle to the axis of the collar, means for fixing the collar immovably on the shaft, a disk rotatably carried on the collar, and means coöperating with said flange and disk, whereby during the rotation of the disk, said disk revolves in the plane of the flange, substantially as specified.

7. In a marker for agricultural implements, in combination, a straight shaft, a collar, a flange on the collar disposed at an acute angle to the axis of the collar, means for fixing the collar on the shaft, whereby the flange on the collar may be normally disposed at an acute angle to the line of draft of the implement, a disk rotatably carried on the collar, and means coöperating with said flange and disk, whereby during the rotation of the disk, said disk revolves in the plane of the flange, substantially as specified.

8. A disk marker, comprising a collar, a flange on said collar disposed at an acute angle to the longitudinal axis of the collar and which is provided with a circular periphery, a disk carried on the collar and free to rotate thereon, and means for holding the disk in relation to the collar, whereby the disk is guided by the collar, substantially as specified.

In testimony that I claim the foregoing as my own, I have hereunto affixed my signature in the presence of two witnesses.

CHARLES H. MYERS.

Witnesses:

BLANCHE HARRINGTON,

ALEXINE DIXON.